March 22, 1960     P. C. MANGAN ET AL     2,929,202
AFTERBURNER FUEL CONTROL APPARATUS
Filed Nov. 14, 1955
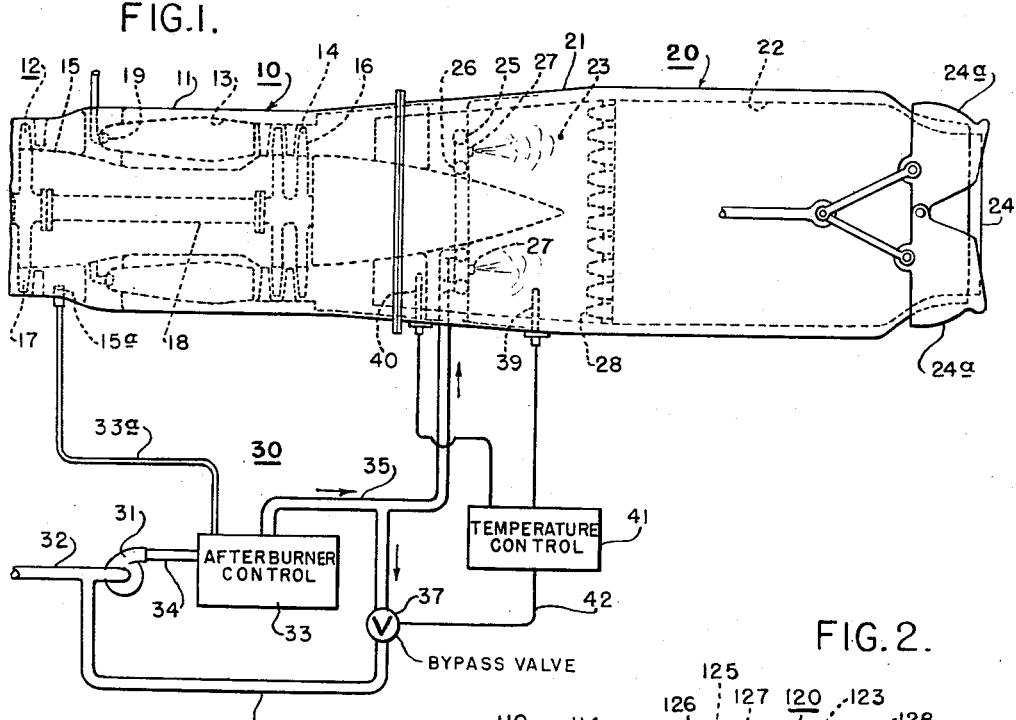
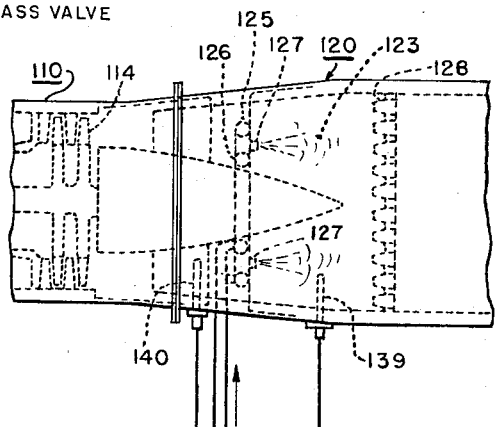
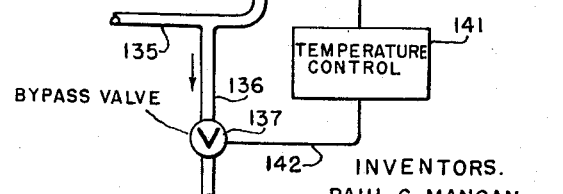
INVENTORS.
PAUL C. MANGAN
FREDERICK W. HENNING
BY Ralph T. French
ATTORNEY United States Patent Office 2,929,202
Patented Mar. 22, 1960

2,929,202

AFTERBURNER FUEL CONTROL APPARATUS

Paul C. Mangan, Pittsburgh, Pa., and Frederick W. Henning, Merriam, Kans., assignors to Westinghouse Electric Corporation, East Pittsburgh, Pa., a corporation of Pennsylvania Application November 14, 1955, Serial No. 546,374

4 Claims. (Cl. 60—35.6)

This invention relates to aviation jet propulsion engines, more particularly to turbo-jet engines provided with an afterburner, and has for an object to provide an improved yet simplified fuel control system therefor.

It is conventional practice on turbo-jet engines provided with an afterburner to schedule rate of fuel delivery to the afterburner as a function of compressor absolute discharge pressure. The compressor absolute discharge pressure is a linear function of afterburner fuel requirements necessary to maintain a combustible mixture having a constant fuel/air ratio in the afterburner. In order to obtain optimum afterburner performance, it is necessary to maintain the fuel/air ratio within very narrow limits. With the allowable 1 to 2% margin of error permitted, considerable effort and complexity of the afterburner fuel control is necessary, especially where it is desirable to provide an afterburner capable of adequate operation in a range of from sea level to 70,000 feet elevation. In an afterburner designed to operate within such limits of elevation, the rate of fuel delivery varies through a range of about 20 to 1, that is, at sea level the afterburner consumes twenty times as much fuel per unit of time as at 70,000 feet elevation.

In view of the above, it is a further object to provide a simplified afterburner fuel control system which provides for optimum fuel/air ratio of the combustible mixture in the afterburner regardless of barometric pressure and other varying conditions.

Applicants have found that when the afterburner is in operation, the temperature between the fuel injectors or nozzles and the flameholders is lower than the temperature of the incoming hot gases exhausted from the turbine. This temperature drop is a function of the fuel/air ratio of the combustible mixture, and the degree of vaporization of the fuel. Since due to the high turbine exhaust temperature, afterburners can be designed to obtain complete fuel vaporization at all times, the temperature drop between the fuel nozzles and the flameholder is, for applicants' purpose, a function of only the fuel/air ratio of the combustible mixture. Accordingly, it is a more specific object of the invention to provide an afterburner fuel control system in which the rate of fuel delivery to the afterburner is varied in a manner to maintain at a predetermined value the difference in temperature between the gas flow in the turbine outlet and the gas flow intermediate the afterburner fuel nozzles and flameholders.

Briefly, the invention resides in providing a first temperature sensing element in the turbine exhaust outlet of a turbo-jet engine upstream of the afterburner fuel nozzles, a second temperature sensing element interposed between the afterburner fuel nozzles and the flameholders to provide a temperature drop indication between the fuel nozzles and the flame holders, and providing means responsive to the temperature drop for regulating the flow of fuel to the afterburner fuel nozzles. In the schematic arrangements shown in the drawing, an afterburner control for metering fuel as required to the afterburner in response to an engine function, such as compressor absolute discharge pressure, is provided with a bypass conduit having a valve responsive to the temperature drop for "trimming," that is correcting, the basic schedule of the afterburner fuel control.

The above and other objects are effected by the invention as will be apparent from the following description taken in connection with the accompanying drawings, forming a part of this application, in which:

Fig. 1 is a diagrammatic representation of an afterburning turbo-jet engine provided with an afterburner fuel control system in accordance with the invention;

Fig. 2 is a fragmentary diagrammatic view similar to Fig. 1 but illustrating the invention in modified form; and Fig. 3 is a chart illustrating the corrective effect of the fuel control systems in Figs. 1 and 2 on the afterburner primary control.

Referring to Fig. 1, there is shown a typical turbojet engine 10 with the inlet and most of the compressor portion cut away and showing the principal elements, comprising a tubular main engine casing 11 housing a compressor 12, a primary combustion chamber 13 and a turbine 14 disposed in axial alignment with each other and having a central core member 15 cooperating with the casing 11 to provide an annular fluid passageway through the engine. The turbine is provided with a rotor 16 which is connected to the compressor rotor 17 by a shaft 18 for driving the latter, as well understood in the art. Fuel nozzles 19 are provided for admitting fuel to the primary combustion chamber 13.

The turbojet engine 10 is provided with an afterburner 20 comprising a tubular shell 21 connected to the rearmost end of the main engine casing 11 and having an inner liner 22 defining a secondary or afterburner combustion chamber 23 in fluid communication with the outlet of the turbine 14 and a rearwardly disposed exhaust nozzle 24. The effective cross-sectional area of the exhaust nozzle may be controlled by a pair of hinged nozzle members 24a. Within the liner 22 are provided a plurality of fuel manifolds 25 and 26 having fuel nozzles 27 for injecting fuel for combustion into the afterburner combustion chamber 23. Also, downstream of the fuel nozzles 27 suitable flame holding means 28 are provided for well known reasons.

In conjunction with the afterburner fuel manifolds 25 and 26 there is provided a fuel control system generally designated 30 made in accordance with the invention, for providing fuel thereto when it is desired to operate the afterburner. The afterburner fuel system 30 has a fuel pump 31 connected to a fuel supply conduit 32 and having its discharge outlet connected to an afterburner control unit 33 by a supply conduit 34. From the afterburner control unit 33, fuel is delivered to the manifolds 25 and 26 by means of a delivery conduit 35. Details of the control unit 33 have not been shown, since it does not form a part of the invention and may be of any desired type for regulating fuel to the afterburner manifolds. Regulation of the control unit 33 may be effected in any desired manner, for example in response to an engine operation effect. As illustrated, the afterburner control unit 33 is arranged to meter fuel to the afterburner manifolds in response to absolute pressure of the air discharged at the outlet of the compressor rotor 17, wherein a pressure probe 15a is provided which communicates with the afterburner control 33 by means of a conduit 33a. As the fuel issues from the nozzles 27, it is vaporized and mixed with the highly heated air and combustion gases flowing from the turbine outlet, thereby forming a fuel and air mixture which is burned to provide a large volume of hot exhaust gases for augmenting the thrust of the jet engine, as well known in the art.

A bypass conduit 36 having one end communicating with the intake of the pump 31 and its other end communicating with the delivery conduit 35 is also provided. In the bypass conduit 36, a variable valve 37 is interposed for regulating fuel flow through the bypass conduit in a manner which will be later described.

A thermal sensing element 39 is disposed intermediate the afterburner fuel nozzles 27 and the afterburner flame holder 28 for sensing the temperature of the secondary combustion chamber 23. The exact location of the sensing element 39 is not critical. However, it must be spaced downstream of the fuel nozzles in a region sufficiently removed from the nozzles to insure that substantially all of the fuel is vaporized. In a typical arrangement this region may be at a distance on the order of 10 to 20 inches from the nozzles 27. In a similar manner, a second temperature sensing element 40 is disposed upstream of the fuel nozzles 27 intermediate the exhaust outlet of the turbine 14 and the fuel manifolds 25 and 26 to detect the temperature of the gases exhausted from the turbine before they are modified in the afterburner. The signals sent out by the temperature sensing elements 39 and 40 are transmitted to a temperature control unit 41, wherein the differential between the two signals is amplified and utilized to provide a signal to operate the valve 37. Details of the temperature control unit have not been shown since it may be of any desirable construction. Also, the thermal sensing elements 39 and 40 may be thermocouples, for example, and the valve 37 may be of the electrically-operated type responding to an electrical signal transmitted from the control unit 41 by means of an electrical conductor 42 to vary the position of the valve in response to differential temperature between the two temperature sensing elements 39 and 40.

In operation, the main fuel flow is delivered from the supply conduit 32 to the afterburner control unit 33 by the fuel pump 31 and metered thereby before delivery to the afterburner manifolds through the delivery conduit 35 to provide the basic fuel requirements for the afterburner. Although fuel delivered thereby is relatively accurate for desired fuel consumption in the afterburner, it has been found that as the engine is operated under varying conditions including higher altitudes the supply of fuel to the manifolds may deviate from the supply required for optimum operating conditions, so that the ratio of the fuel to air mixture is either smaller or larger than desirable. When the fuel/air mixture is larger than desired, this condition is immediately detected by the thermal sensing element 39 which transmits a reduced signal to the control unit 41 in response to a lowering of the temperature of the fuel and air mixture within the combustion chamber 23. Since the thermal sensing element 40 is solely responsive to the temperature of the exhaust gases from the main engine, it is unaffected by a variation in temperature within the combustion chamber 23. Hence, with a reduction in the signal from the thermal sensing element 39, the differential temperature detected by the control unit 41 is effective for transmitting an electrical signal through the conductor 42 to the bypass valve 37, causing the latter to move in opening direction, thereby permitting some of the fuel in the delivery conduit 35 to be bypassed through the bypass conduit 36 to the supply conduit 32, thereby effecting a reduction in the fuel flow to the manifolds.

Conversely, when the fuel/air mixture is smaller than required for optimum operating conditions, the thermal sensing element 39 transmits a larger signal to the control unit 41 in response to an increase in temperature of the fuel/air mixture. The resulting decrease in temperature differential thus detected by the control unit is effective to cause the valve 37 to move in closing direction, thereby reducing the quantity of fuel flowing through the bypass conduit 36 and permitting more fuel to flow to the manifolds.

Referring to Fig. 3, a chart is shown having compressor discharge pressure indicated as the abscissae and rate of fuel flow as the ordinate. This chart illustrates the basic fuel schedule 43 for the afterburner, and the optimum schedule indicated by the irregular line 44. It will be seen that the basic fuel schedule 43 or metered fuel output from the control 33 is always slightly in excess of the optimum schedule 44 and that the variation between the two curves increases as the compressor discharge pressure value increases. There is also shown a dotted line 45 indicating the minimum schedule which may be effected when the valve 37 is in the maximum open position. However, in normal operation, the operation of the valve 37 is preferably such that neither the basic schedule 43 nor the minimum schedule 45 is attained, so that the valve 37 never fully opens or closes during normal operating conditions within the maximum altitude operation of the engine, for example, up to 70,000 feet elevation.

Referring to Fig. 2, there is shown a modified form of the invention of Fig. 1. In this arrangement, a temperature-sensing element 140, disposed in the exhaust outlet of the turbine 114, is connected to a typical primary engine control mechanism (not shown since it forms no part of the invention). In control arrangements of this type, the temperature of the gases at the outlet of the turbine 114 is maintained at a predetermined fixed value, in a manner well known in the art.

An afterburner 120 connected to the turbojet engine 110 is provided with a thermal-sensing element 139, disposed intermediate the afterburner fuel nozzles 127 and the flameholder 128 and connected to a temperature control unit 141. The fuel nozzles 127 are connected to a pair of fuel manifolds 125 and 126 which are in communication with a fuel delivery conduit 135. A bypass conduit 136 having a variable valve 137 interposed therein is also provided in the same manner as illustrated in the first embodiment. This valve is controlled by the control unit 141.

The remainder of the afterburner fuel control system has not been shown, since it may be identical to and operate in the same manner as that shown in the first embodiment.

In operation, as fuel is delivered to the fuel nozzles 127 through the conduit 135, the vaporization of the fuel in the combination chamber 123 results in a drop in the temperature of the fuel and air mixture in the chamber which is detected by the thermal-sensing element 139. The signal from the sensing element 139 is transmitted to the control unit 141, wherein it is amplified and utilized to transmit an electrical signal through the conductor 142 to the bypass valve 137 disposed in the bypass conduit 136 to permit modification of the rate of fuel flow to the afterburner fuel nozzles in the same manner as described in connection with the first embodiment. Since the temperature of the turbine exhaust gases detected by the temperature-sensing element 140 is fixed by the primary engine control, a fixed reference value is thereby always effective to determine the differential between the thermal-sensing element 140 and the thermal-sensing element 139.

It will now be seen that the invention provides a relatively simple yet effective afterburner fuel system which utilizes the temperature drop due to fuel vaporization to provide the optimum rate of fuel flow into the afterburner.

It will also be seen that the invention provides a simple, direct and straight-forward fuel mixture function within the afterburner chamber for regulating the afterburner fuel flow without the necessity for utilizing remote and indirect engine functions which heretofore have necessitated complicated control mechanisms.

Although several embodiments of the invention have been shown, it will be obvious to those skilled in the art that it is not so limited, but is susceptible of various other changes and modifications without departing from the spirit thereof.

What is claimed is:

1. In a turbo-jet engine having a turbine, a primary combustion chamber for providing hot motive fluid to drive said turbine, an afterburner including a secondary combustion chamber in fluid communication with the exhaust outlet of said turbine and providing an exhaust fluid outlet, and means for injecting fuel into said secondary combustion chamber; a fuel control system for said afterburner comprising primary control means for delivering fuel to said fuel injecting means in metered quantity, secondary fuel control means including a valve for modifying the flow of fuel to said fuel injecting means, means including a first temperature sensitive element disposed between the turbine exhaust outlet and the fuel injecting means for sensing the temperature of said hot motive gases, and means for regulating said valve in response to a change in temperature drop effected by vaporization of the injected fuel between said fuel injecting means and a region downstream of the injecting means and upstream of the combustion zone in said secondary combustion chamber, said valve regulating means including a second temperature sensitive element disposed in said region.

2. The structure recited in claim 1 and further including a flameholder disposed downstream of said fuel injecting means, said second temperature sensitive element being disposed between said fuel injecting means and said flameholder.

3. In a turbojet engine having a turbine, a primary combustion chamber for providing hot motive fluid to drive said turbine, and an afterburner including a secondary combustion chamber in fluid communication with the outlet of said turbine and providing an exhaust fluid outlet, means for injecting fuel into said secondary combustion chamber and a flameholder disposed downstream of said fuel injecting means; a fuel control system for said afterburner comprising primary control means for delivering fuel to said fuel injecting means in metered quantity, a fuel conduit in bypass relation to said primary control means, a valve for controlling fuel flow through said conduit, and means for detecting a change in temperature drop between said fuel injecting means and said flameholder including a first temperature sensing element disposed in said turbine outlet, a second temperature sensing element disposed intermediate said fuel injecting means and said flameholder, and means controlled by said first and second temperature sensing elements for regulating said valve.

4. In a turbojet engine having a turbine, a primary combustion chamber for providing hot motive fluid to drive said turbine, said turbine having an exhaust outlet for the motive fluid, means for controlling the temperature of the hot motive fluid including a first temperature sensitive element disposed in said exhaust outlet, and an afterburner including a secondary combustion chamber in fluid communication with the outlet of said turbine and providing an exhaust fluid outlet, means for injecting fuel into said secondary combustion chamber and a flameholder disposed downstream of said fuel injecting means; a fuel control system for said afterburner comprising primary control means for delivering fuel to said fuel injecting means in metered quantity, and means for maintaining a preselected temperature drop between said fuel injecting means and said flameholder including a fuel conduit in bypass relation to said primary control means, a valve for controlling fuel flow through said conduit, means for detecting a change in temperature intermediate said fuel injecting means and said flameholder including a second temperature sensitive element disposed intermediate said fuel injecting means and said flameholder, and means controlled by said temperature detecting means for regulating said valve, whereby the flow of fuel to said injecting means is modified.

References Cited in the file of this patent
UNITED STATES PATENTS

| | | |
|---|---|---|
| 2,740,295 | Perchonok | Apr. 3, 1956 |
| 2,742,756 | De Boisblanc | Apr. 24, 1956 |
| 2,765,619 | Peterson | Oct. 9, 1956 |

FOREIGN PATENTS

| | | |
|---|---|---|
| 1,090,473 | France | Oct. 20, 1954 |